WILT & ALBAUGH.
Corn Planter.

No. 14,785.   Patented Apr. 29, 1856.

UNITED STATES PATENT OFFICE.

SAML. WILT AND GEORGE W. ALBAUGH, OF GREENCASTLE, PA.

IMPROVEMENT IN CORN-PLANTERS.

Specification forming part of Letters Patent No. 14,785, dated April 29, 1856.

*To all whom it may concern:*

Be it known that we, SAML. WILT and GEO. W. ALBAUGH, of Greencastle, in the county of Franklin and State of Pennsylvania, have invented certain new and useful Improvements in Corn-Planters; and we do hereby declare that the following is a full, clear, and exact description of the same, reference being had to the accompanying drawings, making a part of this specification, in which—

Figure 1:
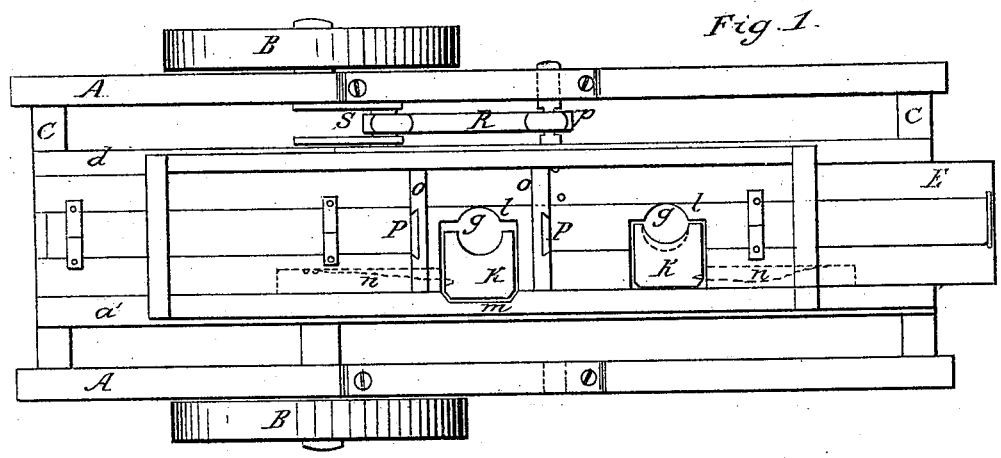
Figure 2:
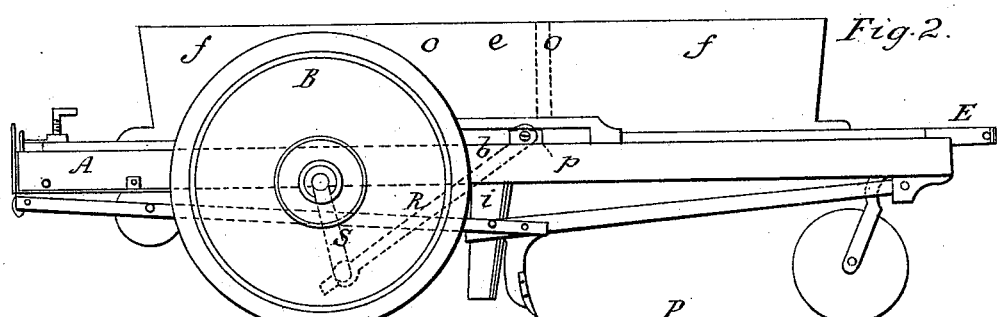

Figure 1 is a top view, and Fig. 2 an elevation, thereof.

The machine is calculated for being propelled by horse-power; and with the view of increasing its usefulness by duplicating the hopper portion, &c., two rows may be planted at the same time.

A A are timbers mounted on driving-wheels B B.

c c are cross-timbers forming with A A a parallelogram.

d d are timbers extending from the cross-framing, giving support to what may be termed the "bottom" of the hopper.

The hopper is divided into three compartments, the central one, e, being intended as a space for the seed to be conveyed from the end compartments, f f, by a sliding board, E, in which are seed-receptacles g g, whose office is to convey the seed received therein on the movement of E into the central compartment, e, and drop it through the openings h and tube i into a drill or furrow of the earth.

Figure 4:
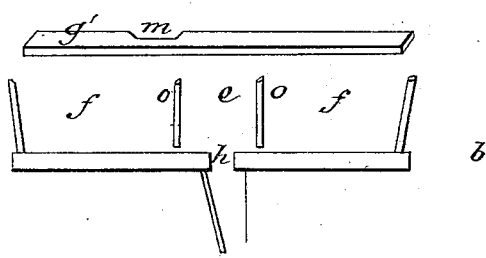

The peculiarity of the seed-receptacle consists in dividing it as seen in Figs. 1 and 4, wherein the receptacle has its sliding portion k pushed out toward the fixed side l in the slide E by means of the side timber, d', as the seed-receptacle g is moved either to the right or left chamber of the hopper; but it will be observed that when the movable portion—viz., k—has reached the opening through the hopper at h its end is thrown into a recess, m, in the side timber, thus enlarging the seed cup or receptacle and permitting the liberation of the seed therefrom with great certainty, this movement of k being accomplished by a stop-spring, n, (see Fig. 1 in red line,) said spring being received in a recess (shown in dotted lines) on the under side of the slide E. On the right side of the figure the spring and opening are shown as contracted for reception of seed, while on the left it is relaxed and the opening enlarged.

Figure 3:
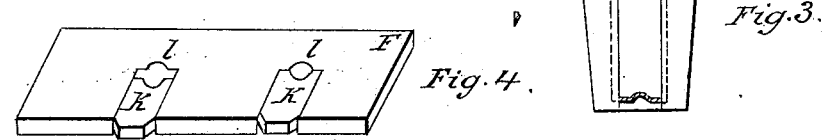

In the divisions O O, or partitions of the hopper, are placed lifting-gates or strikers P. (See Fig. 3.) They are formed of metal, so as to readily drop after being raised by an undue quantity of corn entering the seed-receptacle; and without a provision of this character in those partitions O O the movement of the slide E would be interrupted by the choking from grains of corn rising above the surface of the slide. By our improvement this difficulty is completely avoided. Even should grains of corn be introduced into g endwise by the lifting of the striker, they will pass into the central space, e, of the hopper and be dropped into the drill-tube. This central space renders it easy to the workman to see that the machine is working properly and delivering the grain or seed.

The movement of the slide E is obtained by the pitman-rod R and crank S on the axle of the wheels B B by the sliding arm p, made fast to said slide E.

Below the body of the machine is a suspended cultivator and roller, one for opening the drill or furrow, and the roller for covering the seed after being dropped from the tube.

A bearing-wheel may be used, as shown in the drawings, for supporting the tongue end of the machine.

What we claim as our invention, and desire to secure by Letters Patent, is—

The use of the slide E in corn-planters, operated in the manner described, when provided with expanding grain-receptacles g g, constructed as described, and when the divisions O O of the hopper are provided with strikers P, all operating, substantially in the manner set forth, for the purpose of preventing the choking from wedging of seed, and insuring its delivery to the drill-tube in the manner described.

In testimony whereof we have hereunto signed our names before two subscribing witnesses.

SAMUEL WILT.
GEORGE W. ALBAUGH.

Witnesses:
W. S. CLARK,
JOHN F. CLARK.